United States Patent
Kawaguchi (10) Patent No.: US 10,261,580 B2
(45) Date of Patent: Apr. 16, 2019

(54) MIRROR DEVICE WITH DISPLAY FUNCTION AND METHOD OF CHANGING DIRECTION OF MIRROR DEVICE WITH DISPLAY FUNCTION

(71) Applicant: JVC KENWOOD Corporation, Yokohama-shi, Kanagawa (JP)

(72) Inventor: Tomoyo Kawaguchi, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 14 days.

(21) Appl. No.: 15/462,489

(22) Filed: Mar. 17, 2017

(65) Prior Publication Data

US 2017/0192498 A1    Jul. 6, 2017

Related U.S. Application Data (63) Continuation of application No. PCT/JP2015/074326, filed on Aug. 28, 2015.

(30) Foreign Application Priority Data

Sep. 25, 2014  (JP) ................................ 2014-195077
Jun. 19, 2015  (JP) ................................ 2015-123633

(51) Int. Cl.
    *H04N 5/232*     (2006.01)
    *H04N 7/18*      (2006.01)
    (Continued)

(52) U.S. Cl.
    CPC ................ *G06F 3/012* (2013.01); *B60R 1/04* (2013.01); *B60R 1/12* (2013.01); *G06F 3/147* (2013.01);
    (Continued)

(58) Field of Classification Search
    CPC .......... G02B 27/0172; G02B 2027/014; G02B 2027/0178
    See application file for complete search history.

(56) References Cited

U.S. PATENT DOCUMENTS

2004/0263988 A1* 12/2004 Lin ......................... A47G 1/02
                                                        359/630
2016/0337594 A1* 11/2016 Morishita .............. B60K 35/00

FOREIGN PATENT DOCUMENTS

JP    2001191858 A    7/2001
JP    2002-6285 A     1/2002
(Continued)

OTHER PUBLICATIONS

Official Action dated Dec. 25, 2017 in corresponding with the Japanese counterpart application.

*Primary Examiner* — Nan-Ying Yang
(74) *Attorney, Agent, or Firm* — Nath, Goldberg & Meyer; Jerald L. Meyer (57) ABSTRACT

A mirror device with a display function includes a display panel, a half mirror, a switching unit, and a direction changing unit. The display panel displays an image. The half mirror is provided on a display surface of the display panel. The switching unit performs switching between a mirror mode operation, in which the display of the image on the display panel is stopped and a mirror surface of the half mirror is used, and a display mode operation in which the image is displayed on the display panel. The direction changing unit changes a direction of the display surface or the mirror surface in response to the switching of the mode operation performed by the switching unit.

2 Claims, 11 Drawing Sheets

(51) Int. Cl.
*G02B 27/14* (2006.01)
*B60R 1/04* (2006.01)
*G06F 3/01* (2006.01)
*B60R 1/12* (2006.01)
*G09G 5/10* (2006.01)
*G06F 3/147* (2006.01)
*G09F 9/00* (2006.01)

(52) U.S. Cl.
CPC ........ *G09G 5/10* (2013.01); *B60R 2001/1215* (2013.01); *G09F 9/00* (2013.01); *G09G 2320/08* (2013.01); *G09G 2340/0492* (2013.01); *G09G 2340/14* (2013.01); *G09G 2354/00* (2013.01); *G09G 2380/10* (2013.01)

(56) References Cited

FOREIGN PATENT DOCUMENTS

| | | |
|---|---|---|
| JP | 2002120649 A | 4/2002 |
| JP | 2006-3787 A | 1/2006 |
| JP | 2010130647 A | 6/2010 |
| JP | 2014-49645 A | 3/2014 |

\* cited by examiner

MIRROR DEVICE WITH DISPLAY FUNCTION AND METHOD OF CHANGING DIRECTION OF MIRROR DEVICE WITH DISPLAY FUNCTION

CROSS REFERENCE TO RELATED APPLICATION

This application is a Continuation of PCT Application No. PCT/JP2015/074326, filed on Aug. 28, 2015, and claims the priority of Japanese Patent Application No. 2014-195077, filed on Sep. 25, 2014, and Japanese Patent Application No. 2015-123633, filed on Jun. 19, 2015, the entire contents of all of which are incorporated herein by reference.

BACKGROUND

The present disclosure relates to a mirror device with a display function having both a reflection function and an image display function, and a method of changing a direction of the mirror device with a display function.

A room mirror with a display function has been proposed which is attached to the passenger compartment of an automobile. As a display function, an image of a camera capturing the rear side of the automobile is displayed on the room mirror.

A room mirror is disclosed in Japanese Unexamined Patent Application Publication No. 2001-191858, in which a monitor is provided on a rear surface of a half mirror, and a plurality of camera images are simultaneously displayed on the monitor.

A technique for changing the direction of a room mirror with a partially built-in monitor is disclosed in Japanese Unexamined Patent Application Publication No. 2002-120649.

SUMMARY

When a half mirror is used for a room mirror with a display function, the size of the half mirror is substantially equal to that of a display panel, and by on/off of the display function, switching is performed between a display mode operating as the display function and a mirror mode operating as a mirror function.

When switching between the mirror mode and the display mode is performed using the room mirror with a display function, a direction appropriate to a driver, who is a user, is different in each mode. Therefore, when the user performs switching between the respective modes, there is a problem that an appropriate range is not displayed on the mirror surface, or that the display image is difficult to see.

A first aspect of the embodiments provides a mirror device with a display function, including: a display panel configured to display an image; a half mirror that is provided on a display surface of the display panel; a switching unit configured to perform switching between a mirror mode operation, in which the display of the image on the display panel is stopped and a mirror surface of the half mirror is used, and a display mode operation in which the image is displayed on the display panel; and a direction changing unit configured to change a direction of the display surface or the mirror surface in response to the switching of the mode operation performed by the switching unit.

A second aspect of the embodiments provides a method of changing a direction of a mirror device with a display function, including: depending on whether an image is displayed on a display panel, performing switching between a mirror mode operation in which a mirror surface of a half mirror disposed on a display surface of the display panel and a display mode operation in which the image is displayed on the display panel; and changing a direction of the display surface or the mirror surface in response to the switching.

DETAILED DESCRIPTION

Figure 1:
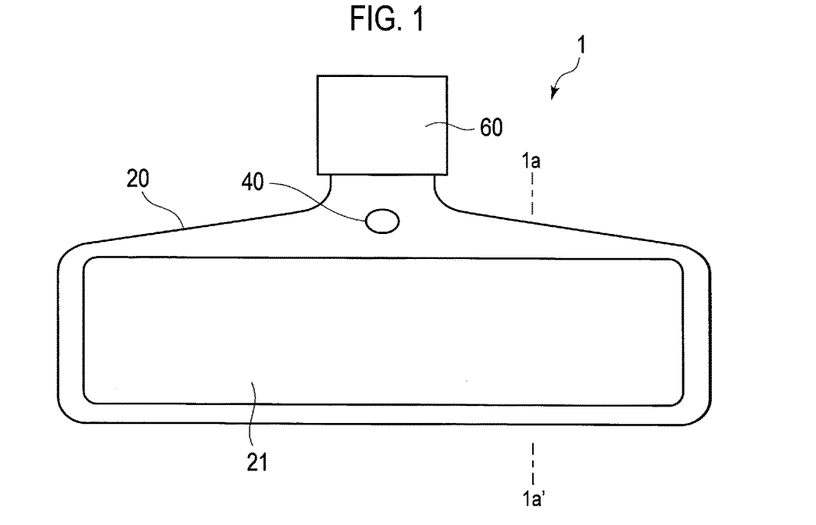
FIG. 1 is an external view of a room mirror with a display function according to the first embodiment.

The first embodiment will be described below. FIG. 1 is an external view of a room mirror 1 with a display function according to the first embodiment, when viewed from a mirror surface 21 as a front. Similarly to a normal room mirror, the room mirror 1 with a display function is mounted on the upper part of a windshield or the like in the traveling direction side of a vehicle viewed from a user.

The room mirror 1 with a display function includes a mirror surface 21 of a half mirror, by which a rear landscape is reflected in the direction of a user, a cover that covers the mirror surface 21 and functions as a housing, and a motion sensor 40 that is a sensor for receiving a user's operation.

In addition, the room mirror 1 with a display function includes a rotation mechanism unit 60 that rotates the room mirror 1. In the embodiment, the user's operation is received using the motion sensor as an example. However, the user's operation may also be received using another operation receiving unit.

The motion sensor 40 is disposed above the center of the room mirror 1 with a display function, but may be disposed at a position away from the room mirror 1 with a display function regardless of disposition places, as long as the motion sensor 40 can appropriately recognize motion of the user's operation without recognizing mistakenly.

Figure 2:
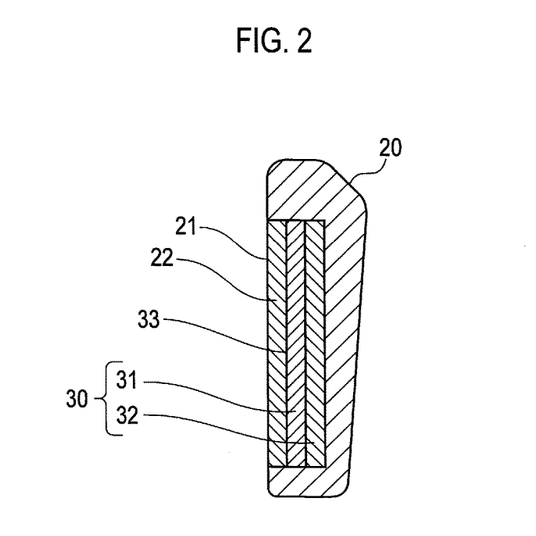
FIG. 2 is a cross-sectional view of the room mirror with a display function according to the first embodiment.

FIG. 2 schematically illustrates a section taken along the line 1*a*-1*a*' of the room mirror 1 with a display function illustrated in FIG. 1.

As illustrated in FIG. 2, the mirror surface 21 is a surface constituted by a half mirror 22. A liquid crystal panel 31 and a backlight 32, having substantially the same shape as the half mirror 22, are disposed at the inner side of the cover 20 (at the rear side of the half mirror 22). The liquid crystal panel 31 and the backlight 32 constitute a display panel 30. A display surface 33 is a surface constituted by the display panel 30.

The backlight 32 is a light source which emits display light to the liquid crystal panel 31. The backlight 32 emits display contents to be displayed on the liquid crystal panel 31, the display contents being the display light.

The display panel 30 may be a spontaneous light-emission display panel having a spontaneous light-emission display element, such as an organic EL (Electro Luminescence) panel, instead of a combination of the liquid crystal panel 31 and the backlight 32, as long as having a configuration in which the image to be displayed is displayed by light emission. In FIG. 2, for example, a power circuit for driving the display panel 30 is not illustrated.

In the room mirror 1 with a display function illustrated in FIGS. 1 and 2, the backlight 32 is not turned on when the display panel 30 is not being displayed, so that the half mirror 22 reflects most of the light incident on the mirror surface 21. Therefore, the room mirror 1 with display function operates as a mirror mode in which the user confirms the rear side by a reflection of the mirror surface 21.

In the room mirror 1 with a display function, the backlight 32 is turned on when the display panel 30 is being displayed, so that the light emitted from the backlight 32 penetrates the half mirror 22 through the liquid crystal panel 31. Therefore, the room mirror 1 with a display function operates in a display mode, in which the display panel 30 displays an image.

Figure 3:
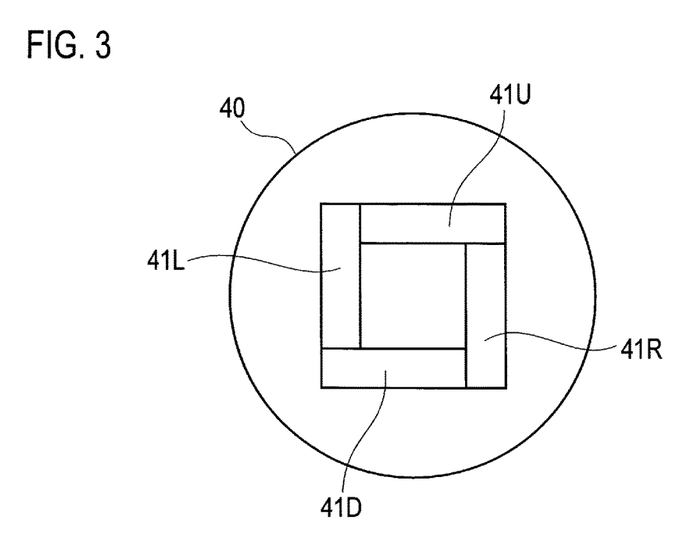
FIG. 3 is a conceptual diagram of a motion sensor used for the room mirror with a display function according to the first embodiment.

FIG. 3 conceptually illustrates the motion sensor 40 used by the room mirror 1 with a display function. The motion sensor 40 is a sensor in which a plurality of photodiodes are combined, and can detect motion in four directions when the sensor is configured by the combination of four photodiodes.

The motion sensor 40 includes an up direction detecting photodiode 41U, a down direction detecting photodiode 41D, a left direction detecting photodiode 41L, and a right direction detecting photodiode 41R therein. The up, down, left, and right directions of each photodiode coincide with those of the room mirror 1, with a display function viewed from a user as illustrated in FIG. 1. Such a motion sensor 40 can detect an object in the range of from 0.1 m to 0.2 m ahead of the motion sensor 40.

Figure 4:
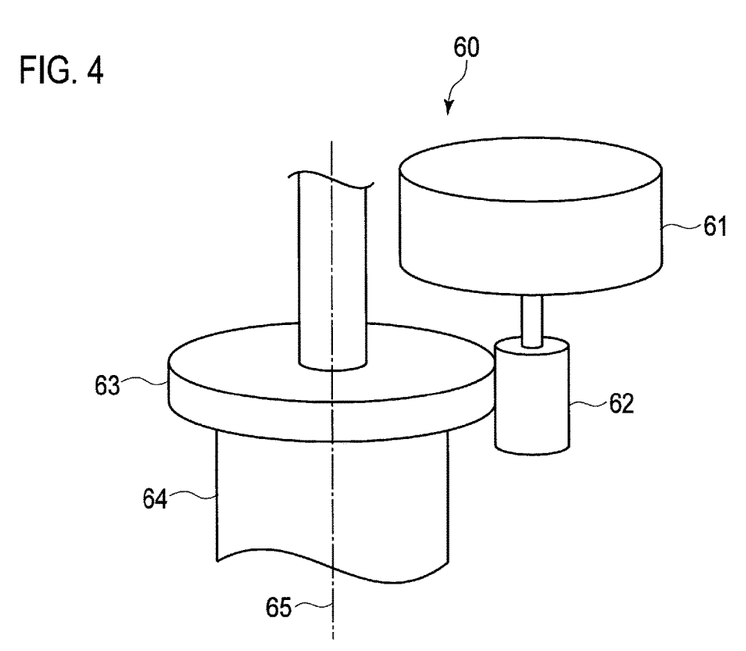
FIG. 4 is a perspective view illustrating a configuration example of a direction changing unit of the room mirror with a display function according to the first embodiment.

FIG. 4 illustrates a configuration example of the rotation mechanism unit 60. The rotation mechanism unit 60 operates based on an instruction signal from the direction controller 108 (illustrated in FIG. 5), to be described below. As a specific example, the rotation mechanism unit 60 includes a drive motor 61, a drive gear 62, a mirror-side gear 63, and a mirror coupling unit 64.

The rotation mechanism unit 60 is configured such that the drive motor 61 rotates by the prescribed number of rotations based on the instruction signal from the direction controller 108, the drive gear 62 transmits the rotation of the drive motor 61 to the mirror-side gear 63, and the mirror coupling unit 64 rotates on a mirror rotation shaft 65 by a prescribed angle. The mirror coupling unit 64 constitutes a part of the cover 20 or is directly attached to the cover 20.

The rotation mechanism unit 60 is not limited to the above configuration, and various drive mechanisms are applicable to the rotation mechanism unit 60. For example, a stepping motor can be used.

Figure 5:
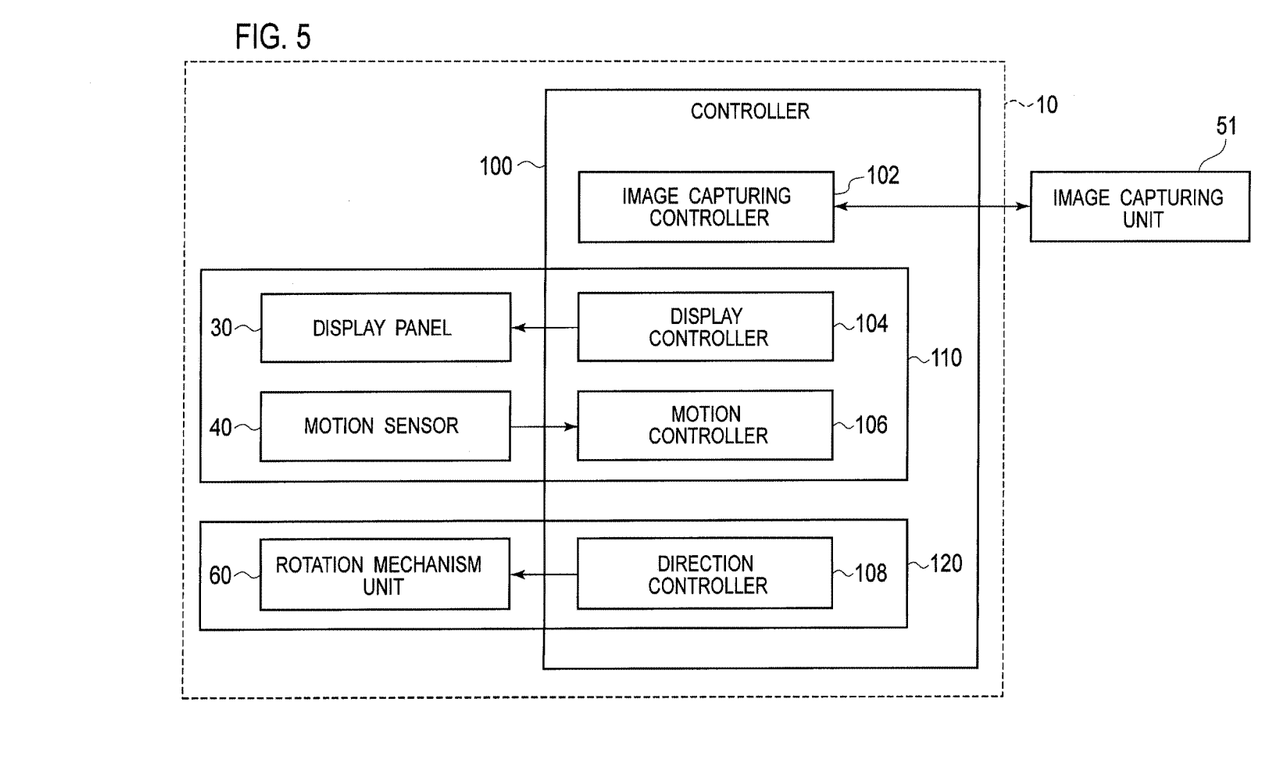
FIG. 5 is a functional block diagram of a mirror device with a display function according to the first embodiment.

FIG. 5 is a functional block diagram of a mirror device 10 with a display function. The mirror device 10 with a display function includes the room mirror 1 with a display function, and a controller 100 that processes various types of data. FIG. 5 illustrates the display panel 30, the motion sensor 40, and the rotation mechanism unit 60 of the room mirror 1 with a display function.

The controller 100 includes a central processing unit (CPU) or a digital signal processor (DSP) that processes various types of data, a memory, and the like. The controller 100 may be built in the room mirror 1 with a display function, or may have a control function of a navigation device, an on-vehicle computer, or the like.

The controller 100 includes an image capturing controller 102, a display controller 104, a motion controller 106, and the direction controller 108, based on functions thereof. Each of the functions may be realized by a control function mounted on a single device, or may be realized by a control function mounted on a plurality of distributed devices.

The display panel 30, the display controller 104, the motion sensor 40, and the motion controller 106 constitute a switching unit 110. In addition, the rotation mechanism unit 60 and the direction controller 108 constitute a direction changing unit 120.

The image capturing unit 51 is a camera that captures the rear side of the vehicle in which the mirror device 10 with a display function is mounted.

The image capturing controller 102 controls the image capturing unit 51 and acquires image data captured by the image capturing unit 51.

The display controller 104 performs a process of causing the display panel 30 to display the image data acquired by the image capturing controller 102. Specifically, the display controller 104 cuts out the image data according to the shape of the display panel 30, or adjusts the luminance or color tone of the image.

Further, the display controller 104 constitutes a part of the switching unit 110. When the room mirror 1 with a display function operates in a mirror mode, the display controller 104 stops the image display of the liquid crystal panel 31 constituting the display panel 30, and stops the turning-on of the backlight 32. When the room mirror 1 with a display function operates in the mirror mode, the image data acquired by the image capturing controller 102 is displayed on the liquid crystal panel 31, and the backlight 32 is turned on.

The motion controller 106 acquires output signals from the motion sensor 40, and detects the motion direction or the like. The motion controller 106 analyzes the distribution of peak values of waveforms of the object detected by four photodiodes of the motion sensor 40, and detects whether the object passes in any direction of the up, down, left, and right directions at the front of motion sensor 40.

Further, the motion controller 106 can detect a reciprocating motion of the object in the up-and-down direction when continuously detecting within a predetermined time that the object passes in the up-and-down direction. Likewise, the motion controller 106 can detect a reciprocating motion of the object in the left-and-right direction.

The motion controller 106 constantly acquires an output value from each of the photodiodes of the motion sensor 40 during the period of motion detection. The motion controller 106 acquires an output value Uout of the up direction detecting photodiode 41U, an output value Dout of the down direction detecting photodiode 41D, an output value Lout of the left direction detecting photodiode 41L, and an output value Rout of the right direction detecting photodiode 41R.

For example, the motion controller 106 determines the motion direction from peak waveforms of the (Uout−Dout)/(Uout+Dout) and (Rout−Lout)/(Rout+Lout). In addition, the motion controller 106 determines that there is a reciprocating motion when detecting a motion direction opposite to the determined motion direction within a predetermined time set to one to two seconds, for example.

The motion controller 106 constitutes a part of the switching unit 110, and detects a prescribed motion direction. At this time, the room mirror 1 with a display function acts as a trigger to switch the mirror mode operation and the display mode operation.

The direction controller 108 controls the rotation mechanism unit 60 using the detection result of the motion controller 106 as a mode switching trigger.

Specifically, when the motion controller 106 performs switching to the display mode from the mirror mode based on the detected motion, the direction controller 108 rotates the drive motor 61 of the rotation mechanism unit 60 from a preset angle in the mirror mode to a preset angle in the display mode.

Similarly, when the motion controller 106 performs switching to the mirror mode from the display mode, the direction controller 108 rotates the drive motor 61 from the angle in the display mode to the angle in the mirror mode.

The motion serving as a switching trigger for the mode by the switching unit 110 is not limited. As a specific example, the switching unit 110 performs switching to another mode from the current mode even when motion is detected in every direction. Alternatively, when motion is detected in the left direction, the switching unit 110 switches the mode to the mirror mode in the case of the display mode, but does not switch the mode in the case of the mirror mode.

Similarly, when motion is detected in the right direction, the switching unit 110 does not switch the mode in the case of the display mode, but switches the mode to the display mode in the case of the mirror mode.

Figure 6:
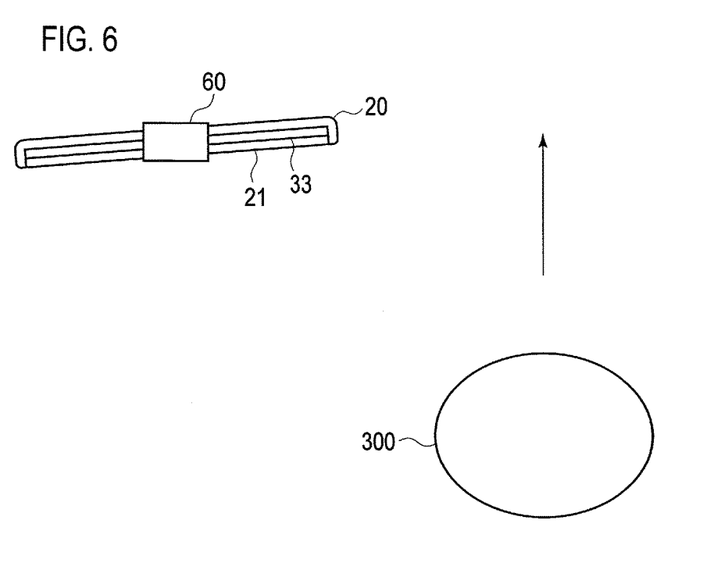
FIG. 6 is a diagram illustrating a direction of the mirror device with a display function according to the first embodiment in a mirror mode.
Figure 7:
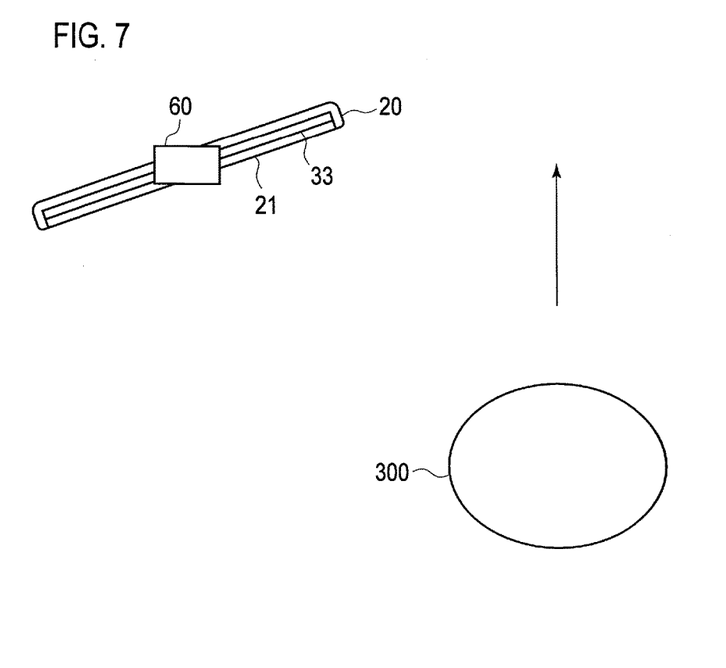
FIG. 7 is a diagram illustrating a direction of the mirror device with a display function according to the first embodiment in a display mode.

FIG. 6 is a conceptual diagram illustrating a direction of the room mirror 1 when the room mirror 1 with a display function operates as the mirror mode. FIG. 7 is a conceptual diagram illustrating a direction of the room mirror 1 when the room mirror 1 with a display function operates as the display mode. FIGS. 6 and 7 illustrate an example of a vehicle in which a driver 300 is seated on a right seat. When the driver is seated on a left seat, directions illustrated in FIGS. 6 and 7 become bilaterally symmetrical.

As illustrated in FIG. 6, the direction in the mirror mode is a direction in which the rear side of the vehicle is reflected on the mirror surface 21 and the reflected image is directed toward the driver 300 as a user. As a specific example, the reflected image is directed toward the driver at an angle of about 5 to 10 degrees from the front. In FIG. 6, an arrow indicates the front of the driver 300 and the front of the vehicle. An angle is adjusted by the driver 300 so that the driver 300 can appropriately check the rear side, and the adjusted angle may be stored as an angle in the mirror mode.

As illustrated in FIG. 7, the direction in the display mode is an angle at which the display surface 33 faces the driver 300. As a specific example, the display surface 33 faces the driver at an angle of about 20 to 30 degrees from the front. In FIG. 7, an arrow indicates the front of the driver 300 and the front of the vehicle. An angle is adjusted by the driver 300 so that the driver 300 can appropriately check the display contents, and the adjusted angle may be stored as an angle in the display mode. Further, the angle in the display mode may be set such that an angle at which the room mirror 1 with a display function does not interfere with a windshield (not illustrated) is an upper limit angle.

Figure 8:
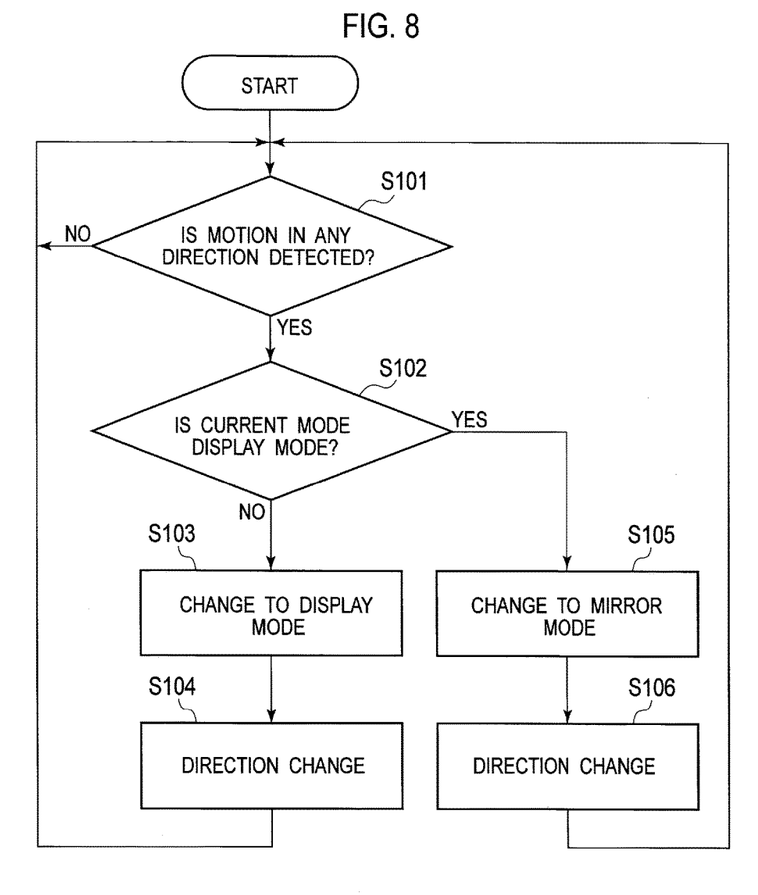
FIG. 8 is a flowchart illustrating a method of changing a direction of the mirror device with a display function according to the first embodiment.

A method of changing the direction of the mirror device 10 with a display function will be described below with reference to FIG. 8.

First, the motion controller 106 constituting the switching unit 110 determines whether the motion sensor 40 detects a motion in any direction (step S101). In step S101, when motion is not detected (No in step S101), the process returns to step S101.

In step S101, when motion is detected in any direction (Yes in step S101), the switching unit 110 determines whether the room mirror 1 with display function operates in the display mode or the mirror mode (step S102). The switching unit 110 can determine any mode, depending on the control history of the rotation mechanism unit 60 by the direction controller 108, or whether the display controller 104 displays the image of the image capturing unit 51 on the display panel 30.

In step S102, when determining that the room mirror 1 operates in the mirror mode rather than the display mode (No in step S102), the switching unit 110 changes the mode such that the room mirror 1 with a display function operates in the display mode (step S103), and the direction changing unit 120 rotates the room mirror 1 with a display function at the same time, so that the direction of the room mirror 1 with a display function becomes the direction in the display mode (step S104).

In step S102, when determining that the room mirror 1 operates in the display mode rather than the mirror mode (Yes in step S102), the switching unit 110 changes the mode such that the room mirror 1 with a display function operates in the mirror mode (step S105), and the direction changing unit 120 rotates the room mirror 1 with a display function at the same time so that the direction of the room mirror 1 with a display function becomes the direction in the mirror mode (step S106).

Through such processing, the driver 300 can use the room mirror 1 with a display function in an appropriate direction according to the operation mode of the room mirror 1 with a display function. Since the driver 300 does not need to manually adjust for every mode switching, the driver can concentrate on checking on the surrounding situation or on driving, leading to an improvement in safety.

In addition, the motion sensor 40 is used as an operation receiving unit for a mode change and a direction change associated with the mode change, and thus the driver 300 can safely and intuitively operate the room mirror 1 with a display function without deviating the line of sight from the surrounding situation of the vehicle, the room mirror 1 with a display function, or the like.

A modified example of the method of changing the direction of the mirror device 10 with a display function will be described below with reference to FIG. 9. A basic technical idea thereof is similar to that of the method of changing the direction of the mirror device 10 with a display function described with reference to FIG. 8. The modified example of the method of changing the direction of the mirror device 10 with display function will be described with reference to FIG. 9 on the assumption that up-and-down direction is also adjustable based on a mechanism (not illustrated) similar to the rotation mechanism unit 60 in addition to the fact that the direction of the room mirror 1 with display function is adjusted by the rotation mechanism unit 60.

The up-and-down direction adjusting mechanism of the room mirror 1 with a display function operates under the control of the direction controller 108. The up-and-down direction adjusting mechanism is provided inside the cover 20, and may drive the display panel 30 and the half mirror 22 in the up-and-down direction with respect to the cover 20.

Figure 9:
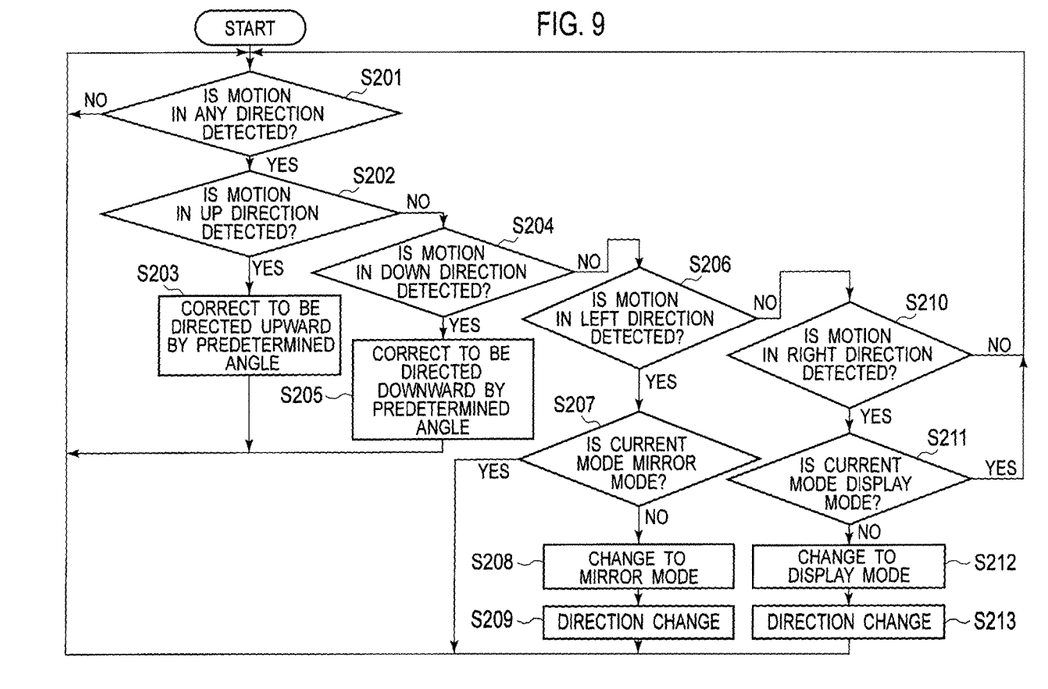
FIG. 9 is a flowchart illustrating a modified example of a method of changing the direction of the mirror device with a display function according to the first embodiment.

Furthermore, FIG. 9 illustrates a case where the mirror device 10 with a display function is mounted on a vehicle in which the driver 300 is seated in the right seat. When the driver is seated in the left seat, processes become bilaterally-symmetrical to each other.

First, the motion controller 106 determines whether the motion sensor 40 detects a motion in any direction (step S201). In step S201, when motion is not detected (No in step S201), the process returns to step S201. In step S201, when motion is detected in any direction (Yes in step S201), the motion controller 106 determines whether the detected motion is a motion in the up direction (step S202).

In step S202, when it is determined that motion is detected in the up direction (Yes in step S202), the direction controller 108 constituting the direction changing unit 120 operates the rotation mechanism unit 60, acting as the up-and-down direction adjusting mechanism of the room mirror 1 with a display function, so that the room mirror 1 with a display function is directed upward by a predetermined angle (step S203). In step S202, when motion is not detected in the up direction (No in step S202), the motion controller 106 determines whether the detected motion is a motion in the down direction (step S204).

In step S204, when it is determined that motion is detected in the down direction (Yes in step S204), the direction controller 108 operates the rotation mechanism unit 60 acting as the up-and-down direction adjusting mechanism of the room mirror 1 with a display function, so that the room mirror 1 with a display function is directed downward by a predetermined angle (step S205).

In step S204, when it is determined that motion is not detected in the down direction (No in step S204), the motion controller 106 determines whether the detected motion is in the left direction (step S206).

In step S206, when it is determined that motion is detected in the left direction (Yes in step S206), the switching unit 110 determines whether the room mirror 1 with display function operates in the mirror mode or the display mode (step S207).

In step S207, when determining that the room mirror 1 operates in the mirror mode (Yes in step S207), the switching unit 110 does not change the mode and the direction of the room mirror 1 with a display function. In step S207, when determining that the room mirror 1 operates in the display mode (No in step S207), the switching unit 110 changes the mode such that the room mirror 1 with a display function operates in the mirror mode (step S208), and the direction changing unit 120 rotates the room mirror 1 with a display function at the same time, so that the direction of the room mirror 1 with a display function becomes the direction in the mirror mode (step S209).

In step S206, when it is determined that motion is not detected in the left direction (No in step S206), the motion controller 106 determines whether the detected motion is in the right direction (step S210).

In step S210, when it is determined that motion is detected in the right direction (Yes in step S210), the switching unit 110 determines whether the room mirror 1 with a display function operates in the mirror mode or the display mode (step S211).

In step S211, when determining that the room mirror 1 operates in the display mode (Yes in step S211), the switching unit 110 does not change the mode or the direction of the room mirror 1 with a display function.

In step S211, when determining that the room mirror 1 operates in the mirror mode (No in step S207), the switching unit 110 changes the mode such that the room mirror 1 with a display function operates in the display mode (step S212), and the direction changing unit 120 rotates the room mirror 1 with a display function at the same time so that the direction of the room mirror 1 with a display function becomes the direction in the display mode (step S213).

Through such processing, the driver 300 can use the room mirror 1 with display function in an appropriate direction according to the operation mode of the room mirror 1 with a display function. Since the driver 300 does not need to manually adjust for every mode switching, the driver can concentrate on checking of the surrounding situation or on driving, leading to improvements in safety.

In addition, the motion sensor 40 is used as an operation receiving unit for a mode change and a direction change associated with the mode change, and thus the driver 300 can safely and intuitively operate the room mirror 1 with a display function without deviating the line of sight from the surrounding situation of the vehicle, the room mirror 1 with a display function, or the like.

Furthermore, since the change in direction of the room mirror 1 with a display function due to the mode switching is the same as the direction of the mode switching motion, the driver 300 can safely and intuitively operate the room mirror 1 with a display function without erroneous operation.

Figure 10:
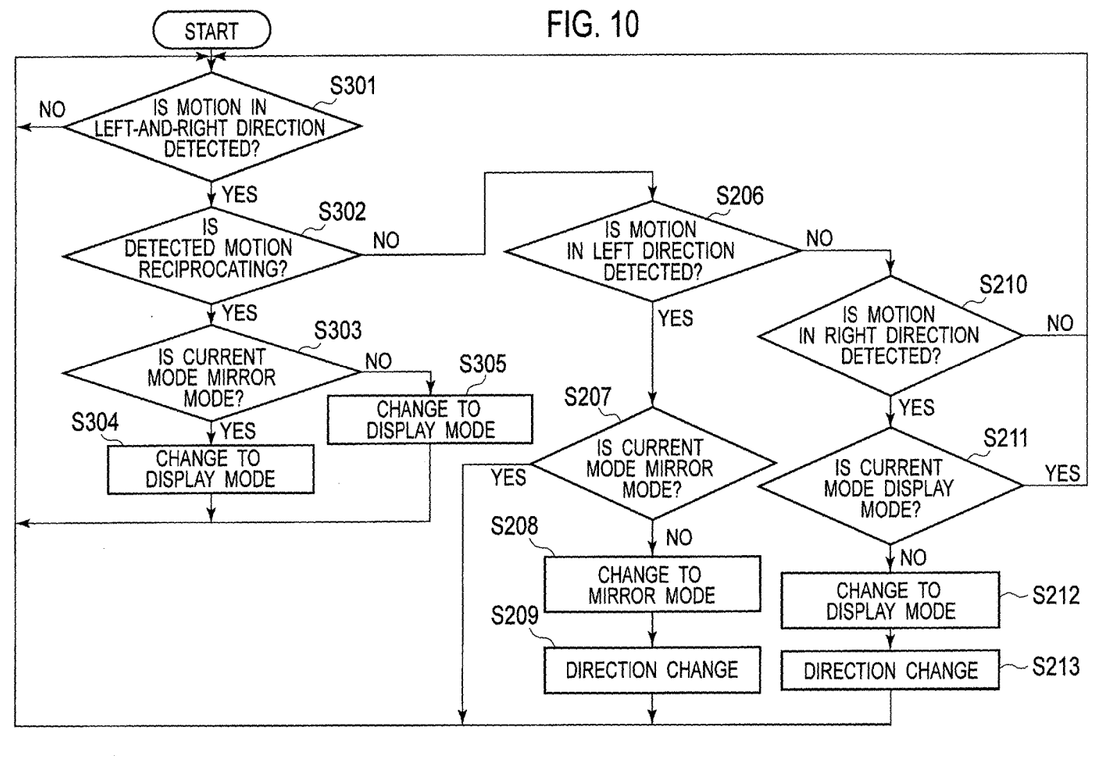
FIG. 10 is a flowchart illustrating another modified example of a method of changing the direction of the mirror device with a display function according to the first embodiment.

Another modified example of the method of changing the direction of the mirror device 10 with a display function will be described below, with reference to FIG. 10. A basic technical idea thereof is similar to that of the method of changing the direction of the mirror device 10 with a display function, described with reference to FIG. 8. Similarly to the description with reference to FIG. 9, FIG. 10 illustrates a case where the mirror device 10 with a display function is mounted on a vehicle in which the driver 300 is seated in the right seat. When the mirror device 10 with a display function is mounted on a vehicle in which the driver is seated in the left seat, processes become bilaterally-symmetrical to each other.

First, the motion controller 106 determines whether the motion sensor 40 detects motion in either of the left or the right directions (step S301). In step S301, when motion is not detected (No in step S301), the process returns to step S301.

In step S301, when motion is detected in either of the left or right directions (Yes in step S301), the motion controller 106 determines whether the detected motion is a reciprocating motion (step S302). As described above, whether the detected motion is the reciprocating motion can be determined depending on whether the rightward motion and the leftward motion are detected or the leftward motion and the rightward motion are successively detected within a predetermined time.

In step S302, when it is determined that the detected motion is a reciprocating motion (Yes in step S302), the switching unit 110 determines whether the room mirror 1 with a display function operates in the mirror mode or the display mode (step S303).

In step S303, when determining that the room mirror 1 operates in the mirror mode (Yes in step S303), the switching unit 110 switches the operation mode of the room mirror 1 with a display function to the display mode (step S304). At this time, the direction changing unit 120 does not change the direction of the room mirror 1 with a display function.

In step S303, when determining that the room mirror 1 operates in the display mode (No in step S303), the switching unit 110 switches the operation mode of the room mirror 1 with a display function to the mirror mode (step S305). At this time, the direction changing unit 120 does not change the direction of the room mirror 1 with a display function.

In step S302, when it is determined that the detected motion is not a reciprocating motion (No in step S302), the motion controller 106 determines whether the detected motion is a leftward motion (step S206). The following processes are the same as the processes described with reference to FIG. 9.

Through such processing, the driver 300 can use the room mirror 1 with a display function in an appropriate direction, according to the operation mode of the room mirror 1 with a display function. Since the driver 300 does not need to manually adjust for every mode switching, the driver can concentrate on checking on the surrounding situation or on driving, leading to improvement in safety.

In addition, the motion sensor 40 is used as an operation receiving unit for a mode change and a direction change associated with the mode change, and thus the driver 300 can safely and intuitively operate the room mirror 1 with a display function without deviating the line of sight from the surrounding situation of the vehicle, the room mirror 1 with a display function, or the like.

Furthermore, since the change in direction of the room mirror 1 with a display function due to the mode switching is the same as the direction of the mode switching motion, the driver 300 can safely and intuitively operate the room mirror 1 with a display function without erroneous operation. Even when the direction change of the room mirror 1 with a display function is not required in the mode switching, the driver 300 can safely and intuitively perform the desired operation.

The second embodiment will be described below. A mirror device 10 with a display function according to the second embodiment has a configuration similar to that of the first embodiment. The second embodiment differs from the first embodiment in terms of operation of the switching unit 110.

As in the first embodiment, the mirror device 10 with a display function is configured such that the direction of the display surface 33 or the mirror surface 21 is changed in response to the switching of the display mode by the switching unit 110. In such a direction change operation, since the direction is changed by the operation of the rotation mechanism unit 60 under the control of the direction controller 108, for example, a period of direction change from 2 seconds to 5 seconds is generated from the start of the direction change until the end of the direction change.

The switching unit 110 needs to perform the switching between the mirror mode and the display mode at any timing from the start of the direction change to the end of the direction change. Merely, the stop or start of displaying on the display panel 30 at any timing may result in a period in which the rear check, due to the reflection of the half mirror 22 and the visual confirmation of the rear image on the liquid crystal panel 31, are not available during the period of direction change.

The second embodiment is to solve the above problems occurring during the period of direction change when the display panel 30 includes the liquid crystal panel 31 and the backlight 32.

Figure 11:
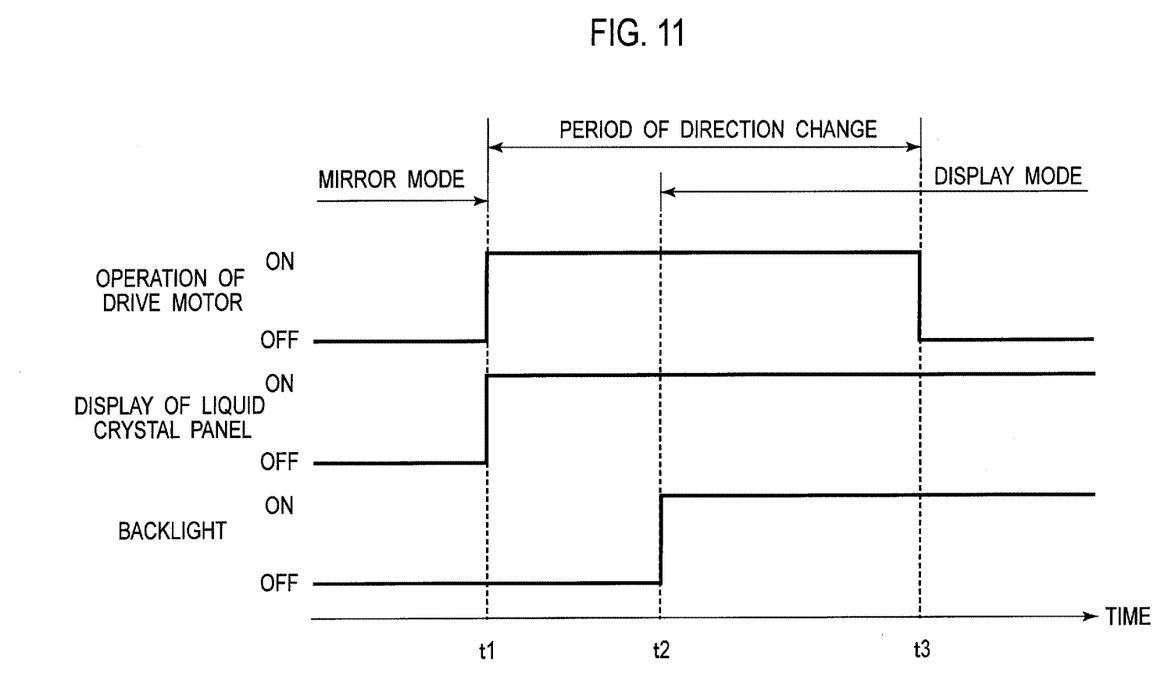
FIG. 11 is a diagram illustrating an operation example of a mirror device with a display function according to the second embodiment.

FIG. 11 illustrates a flow of the operation when switching is performed from the mirror mode to the display mode by the operation of the switching unit 110, wherein a horizontal axis represents a time axis. For example, when the mirror device 10 with a display function is operating as a mirror mode, the direction changing unit 120 operates the drive motor 61 at the time and immediately after the motion sensor 40 and the motion controller 106 detect the motion indicating the switching from the mirror mode to the display mode.

Assuming that timing t1 is defined as timing at which the drive motor 61 starts to operate, and timing t3 is defined as timing at which the operation of the drive motor ends and thus the direction change is completed, the period of direction change corresponds to a period between the timing t1 and the timing t3.

During the period of direction change, the display controller 104 displays the image data acquired by the image capturing controller 102 on the liquid crystal panel 31 at the timing t1, but does not allow the backlight 32 to turn on until the timing t2, that is in the middle of the period of direction change. For this reason, during the period from the timing t1 to the timing t2, the rear side can be checked by the half mirror 22, and rear image data is also in a visible state, although not being displayed brightly enough on the liquid crystal panel 31.

The display controller 104 turns on the backlight 32 at the timing t2, and the mirror device 10 with a display function operates as the display mode after the timing t2. The timing t2 is preferably a timing near the middle between the timing t1 and the timing t3, and more preferably a timing closer to the timing t1 from the middle between the timing t1 and the timing t3.

The reasons are as follows. A user wants to display in the display mode at the timing t1. The period from the timing t1 to the timing t2 is a buffering period at which a situation that the user suddenly cannot check the rear side by the mirror mode is prevented. In addition, it is necessary to switch to the display mode, which is requested by the user, at the timing as early as possible.

Figure 12:
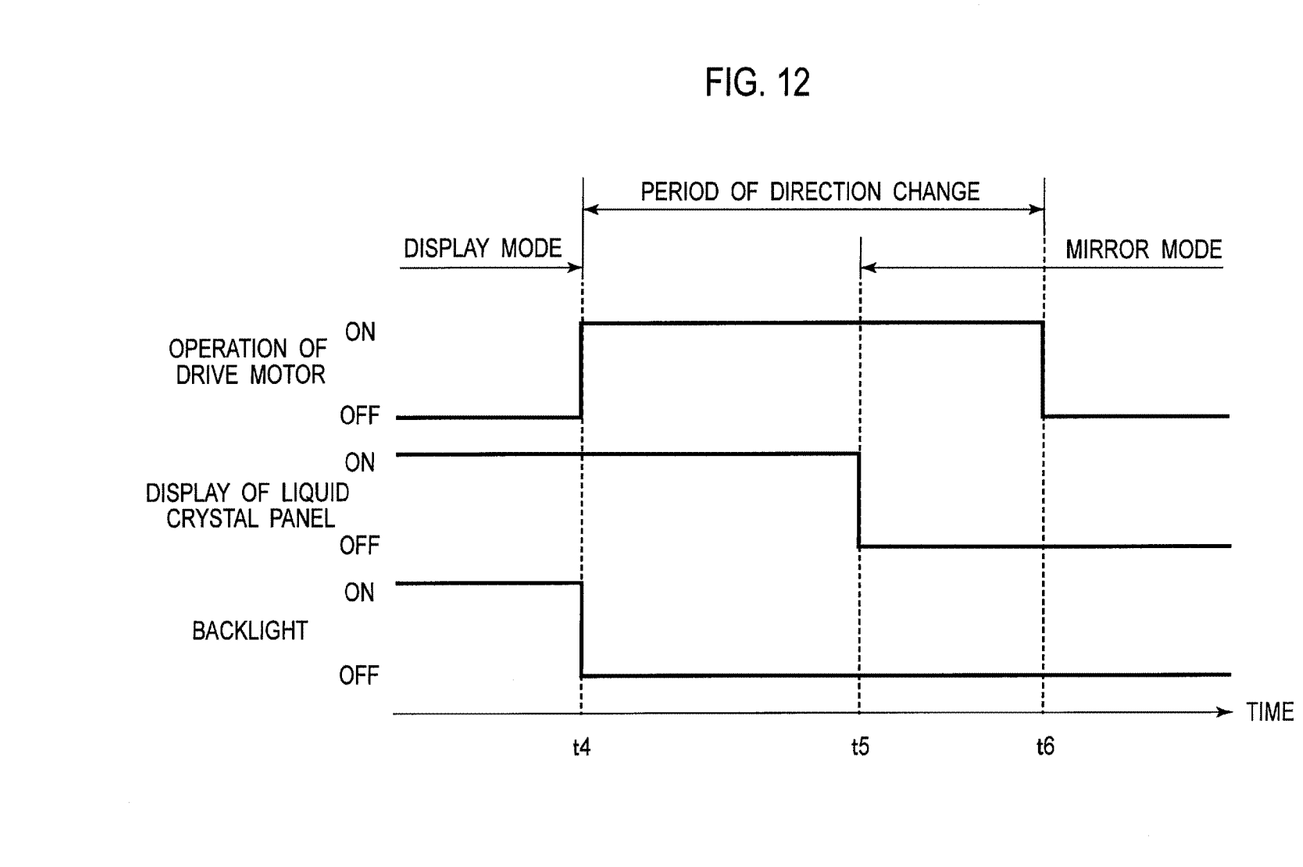
FIG. 12 is a diagram illustrating an operation example of the mirror device with a display function according to the second embodiment.

Contrary to FIG. 11, FIG. 12 illustrates a flow of the operation when switching is performed from the display mode to the mirror mode by the operation of switching unit 110, wherein a horizontal axis represents a time axis. For example, when the mirror device 10 with a display function is operating as a display mode, the direction changing unit 120 operates the drive motor 61 at the time and immediately after the motion sensor 40 and the motion controller 106 detect the motion indicating switching from the display mode to the mirror mode.

Assuming that the timing t4 is defined as a timing at which the drive motor 61 starts to operate, and the timing t6 is defined as a timing at which the operation of the drive motor 61 ends and thus the direction change is completed, the period of direction change corresponds to a period between the timing t4 and the timing t6.

During the period of direction change, the controller 104 turns off the backlight 32 at the timing t4, but continuously displays image data on the liquid crystal panel 31 until timing t5 that is in the middle of the period of direction change. For this reason, during the period from the timing t4 to the timing t5, the rear side can be checked by the half mirror 22, and rear image data is also in a visible state, although not being displayed brightly enough on the liquid crystal panel 31.

The display controller 104 ends the display of the image data on the liquid crystal panel 31 at the timing t5, and the mirror device 10 with a display function operates as the mirror mode after the timing t5. The timing t5 is preferably a timing near the middle between the timing t4 and the timing t6, and more preferably a timing closer to the timing t6 from the middle between the timing t4 and the timing t6.

The reasons are as follows. The user wants to check the rear side in the mirror mode at the timing t4. The backlight 32 is turned off at the timing t4, and thus the rear side can be checked by reflection due to the half mirror 22, although the display contents on the liquid crystal panel 31 can be seen. The period from the timing t4 to the timing t5 is a buffering period at which a situation that the user suddenly cannot visually check the image by the display mode is prevented. Accordingly, the longer the buffering period, the better the user can utilize the function of both modes.

According to the second embodiment, during the period of direction change, the period at which the image is displayed on the liquid crystal panel 31 and the backlight 32, serving as a light source of the liquid crystal panel 31 that is not turned on, is provided. Thus, the period at which the functions of both the display mode and the mirror mode coexist is provided, so that it is possible to reduce confusion and judgment errors of the user due to suddenly disabling one of the functions.

The third embodiment will be described below. A mirror device 10 with a display function according to the third embodiment has a configuration similar to that of the first embodiment. The third embodiment differs from the first embodiment in terms of operation of the switching unit 110.

The third embodiment is configured to solve the problem occurring during the period of direction change raised in the second embodiment by using another method. In the second embodiment, the display panel 30 is configured to include the liquid crystal panel 31 and the backlight 32. In the third embodiment, however, the display panel 30 is configured to include the liquid crystal panel 31 and the backlight 32, or is also applicable to a spontaneous light-emission display panel such as an organic EL panel.

Figure 13:
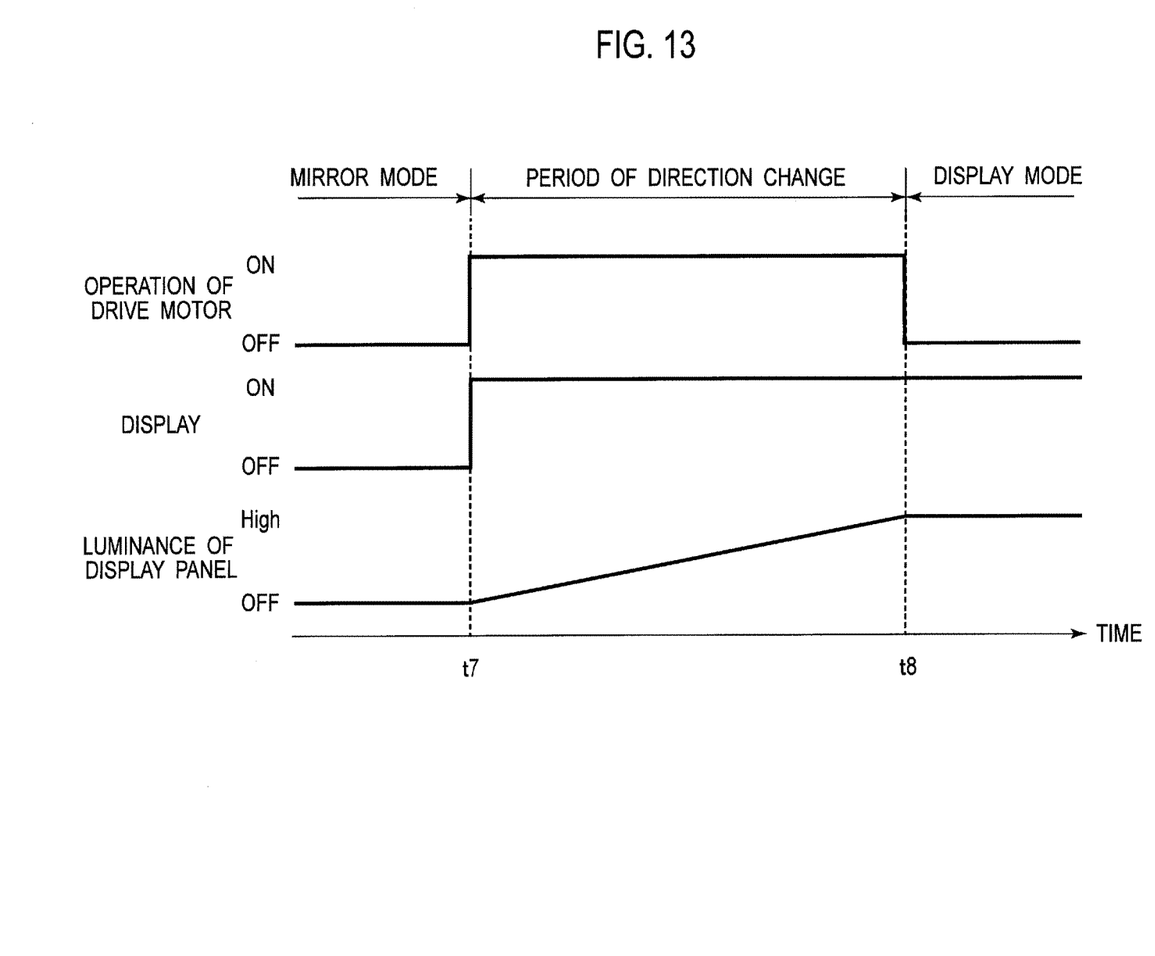
FIG. 13 is a diagram illustrating an operation example of a mirror device with a display function according to a third embodiment.

FIG. 13 illustrates a flow of the operation when switching is performed from the mirror mode to the display mode by the operation of the switching unit 110, wherein a horizontal axis represents a time axis. For example, when the mirror device 10 with a display function is operating as a mirror mode, the direction changing unit 120 operates the drive motor 61 at the time and immediately after the motion sensor 40 and the motion controller 106 detect the motion indicating the switching from the mirror mode to the display mode.

Assuming that the timing t7 is defined as a timing at which the drive motor 61 starts to operate and the timing t8 is defined as a timing at which the operation of the drive motor 61 ends and thus the direction change is completed, the period of direction change corresponds to a period between the timing t7 and the timing t8.

During the period of direction change, the display controller 104 displays the image data acquired by the image capturing controller 102 on the liquid crystal panel 31 at the timing t7. The display controller 104 does not cause the backlight 32 to emit light with luminance in a normal display mode at the timing t7, and controls the backlight 32 such that the luminance thereof gradually increases during the period of direction change.

For this reason, during the period of direction change, the image data starts to be displayed on the liquid crystal panel 31 from the timing t7, but the rear side can actually be checked by the half mirror 22; and as the timing approaches the timing t8, the luminance of the backlight 32 becomes higher. Accordingly, during the period of direction change, as the timing gradually continues, the visual confirmation of the rear image data on the liquid crystal panel 31 becomes predominant over the rear side check by the half mirror 22, and the mode is completely changed over to the display mode at the timing t8.

Figure 14:
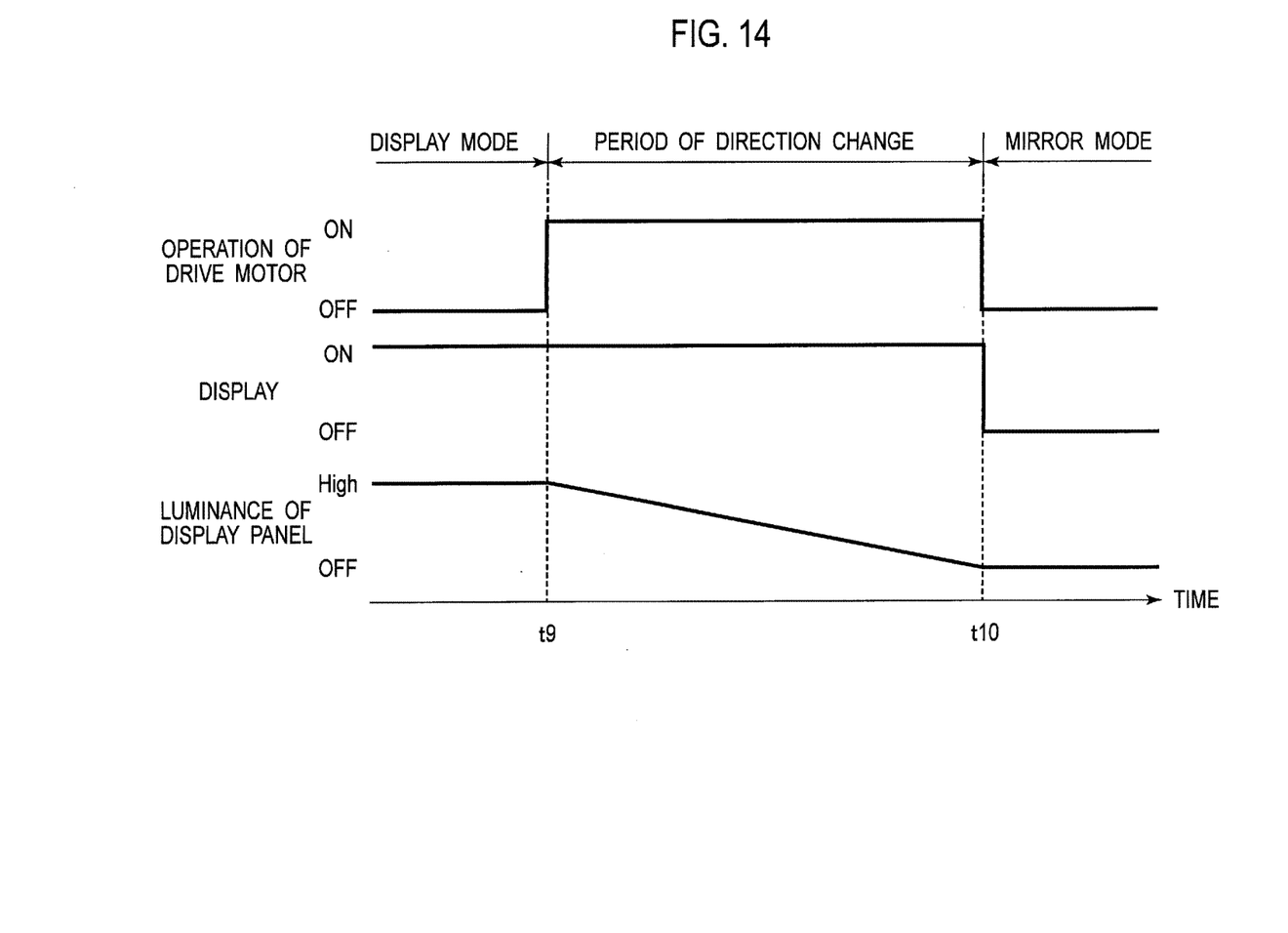
FIG. 14 is a diagram illustrating an operation example of the mirror device with a display function according to the third embodiment.

Contrary to FIG. 13, FIG. 14 illustrates a flow of the operation when switching is performed from the display mode to the mirror mode by the operation of the switching unit 110, wherein a horizontal axis represents a time axis. For example, when the mirror device 10 with a display function is operating as a display mode, the direction changing unit 120 operates the drive motor 61 at the time and immediately after the motion sensor 40 and the motion controller 106 detect the motion indicating switching from the display mode to the mirror mode.

Assuming that the timing t9 is defined as timing at which the drive motor 61 starts to operate, and the timing t10 is defined as timing at which the operation of the drive motor 61 ends and thus the direction change is completed, the period of direction change corresponds to a period between the timing t9 and the timing t10.

During the period of direction change, the display controller 104 keeps displaying the image data on the liquid crystal panel 31 until the timing t10, at which the period of direction change ends. The display controller 104 causes the backlight 32 to emit light with luminance in a normal display mode at the timing t9, and controls the backlight 32 such that the luminance thereof gradually lowers as the timing continues.

For this reason, during the period of direction change, the luminance of the backlight 32 becomes lower from the timing t9, but the image data on the liquid crystal panel 31 is also visible; and as the timing approaches the timing t10, the luminance of the backlight becomes lower. Accordingly, during the period of direction change, as the timing gradually continues, the rear side check by the half mirror 22 becomes predominant over the visual confirmation of the rear image data on the liquid crystal panel 31, and the mode is completely changed over to the mirror mode at the timing t10.

The luminance of the display panel in FIGS. 13 and 14 is the luminance of the backlight 32, and the fact that the luminance is "high" means normal luminance of the backlight 32 in the display mode. In addition, the transition of the luminance of the display panel during the period of direction change may not be linear, and the start timing or the end timing of the change in the luminance may not necessarily coincide with the start timing or the end timing of the period of direction change.

In the third embodiment, the display panel 30 is configured to include the liquid crystal panel 31 and the backlight 32, and the display luminance of the display panel 30 is taken as the luminance of the backlight 32 in FIGS. 13 and 14. When the display panel 30 employs a spontaneous light-emission display panel such as an organic EL panel, the display luminance of the display panel 30 is a light-emitting luminance of the spontaneous light-emission display panel, and the light-emitting luminance of the spontaneous light-emission display panel may be controlled as illustrated in FIG. 13 or 14.

As described above, according to the embodiments, the room mirror with display function can appropriately change the direction depending on the mirror mode and the display mode.

The embodiments of the invention can be variously modified without departing from the scope of the invention. For example, since the embodiments have the configuration in which the room mirror 1 with a display function rotates as a whole due to the driving of the rotation mechanism unit 60, the directions of the display surface 33 and the mirror surface 21 are simultaneously changed in response to the switching of the mode.

On the other hand, the embodiments may be configured in a way in which the rotation mechanism unit 60 is disposed inside the cover 20, so that only the direction of the half mirror 22 can be changed.

In this case, when the room mirror 1 with a display function is operating as the display mode, both the display surface 33 and the mirror surface 21 are directed to face the driver 300, as illustrated in FIG. 7. When the room mirror 1 with a display function is operating in the mirror mode, the direction of the cover 20 or the display panel 30 is not changed from the display mode, and only the direction of the half mirror 22 may be changed to a direction in which the driver 300 can check the rear side of the vehicle, by the driving of the rotation mechanism unit 60.

In such a configuration, the cover 20 is desirably formed to cover the half mirror 22 and the display panel 30 even before and after the direction of the half mirror 22 is changed.

What is claimed is:

1. A mirror device with display function, comprising:
   a display panel configured to display an image;
   a half mirror that is provided on a display surface of the display panel;
   a switching unit configured to perform switching between a mirror mode operation, in which the display of the image on the display panel is stopped and a mirror surface of the half mirror is used, and a display mode operation in which the image is displayed on the display panel;
   a direction changing unit configured to change a direction of the display surface and the mirror surface in response to the switching of the mode operation performed by the switching unit; and
   a display controller configured to increase display luminance of the display panel during a period from a first timing to a second timing, the first timing being defined as a timing at which the direction changing unit starts changing the direction of the display surface and the mirror surface, and the second timing being defined as a timing at which the direction changing unit ends changing the direction of the display surface and the mirror surface, in response to the switching from the mirror mode operation to the display mode operation,
   wherein the display panel is a spontaneous light-emission display panel,
   and wherein the display controller increases light-emitting luminance of the spontaneous light-emission display panel from the first timing to the second timing.

2. A mirror device with a display function, comprising:
   a display panel configured to display an image;
   a half mirror that is provided on a display surface of the display panel;
   a switching unit configured to perform switching between a mirror mode operation, in which the display of the image on the display panel is stopped and a mirror surface of the half mirror is used, and a display mode operation in which the image is displayed on the display panel;
   a direction changing unit configured to change a direction of the display surface and the mirror surface in response to the switching of the mode operation performed by the switching unit; and
   a display controller configured to decrease display luminance of the display panel during a period from a first timing to a second timing, the first timing being defined as a timing at which the direction changing unit starts changing the direction of the display surface and the mirror surface, and the second timing being defined as a timing at which the direction changing unit ends changing the direction of the display surface and the mirror surface, in response to the switching from the display mode operation to the mirror mode operation,
   wherein the display panel is a spontaneous light-emission display panel,
   and wherein the display controller decreases light-emitting luminance of the spontaneous light-emission display panel from the first timing to the second timing, and stops emitting light of the spontaneous light-emission display panel.

* * * * *